June 19, 1928.
W. HALLBERG
1,674,202
DAMPER
Filed Oct. 18, 1926
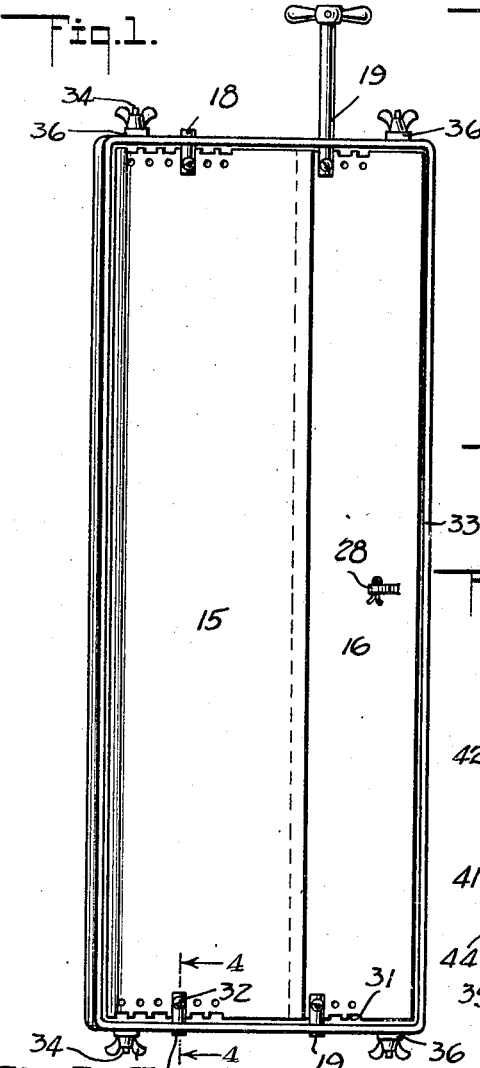
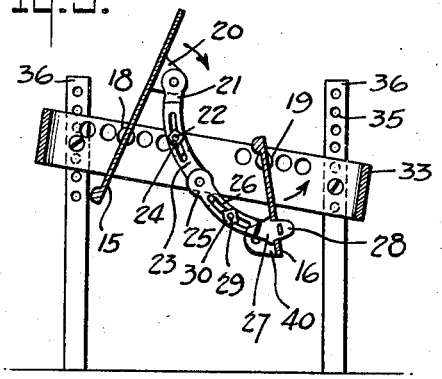
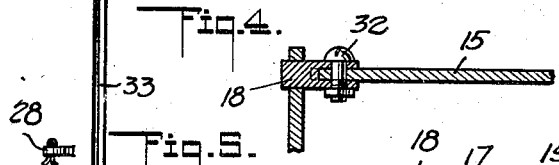
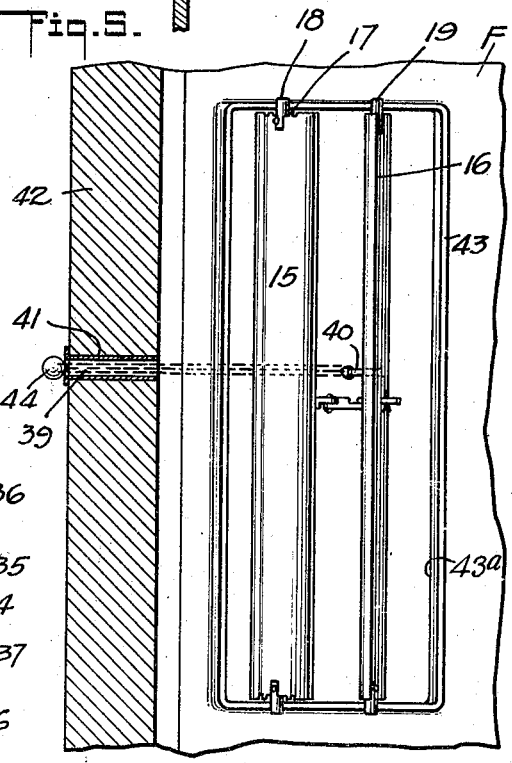
INVENTOR
WILLIAM HALLBERG
BY
ATTORNEY

Patented June 19, 1928.

1,674,202

UNITED STATES PATENT OFFICE.

WILLIAM HALLBERG, OF LOS ANGELES, CALIFORNIA.

DAMPER.

Application filed October 18, 1926. Serial No. 142,510.

My invention relates to dampers as used in flues of heating apparatus, and a purpose of my invention is the provision of a damper which normally gravitates to closed position, but which is manually movable to open position so that when released it will automatically move to closed position.

It is also a purpose of my invention to provide a self-closing damper which is applicable to vertical flues and flues of different inclinations, my invention embodying a device by which the damper can be adjusted prior to its application to a particular flue so that when applied it will, when released, gravitate to closed position irrespective of the inclination of the particular flue.

I will describe only one form of damper and one form of adjusting device, each embodying my invention, and will then point out the novel features thereof in claims.

In the accompanying drawings,

Figure 1 is a view showing in plan one form of damper in applied position to one form of adjusting device, each embodying my invention;

Figure 2 is a view showing the adjusting device in end elevation;

Figure 3 is a vertical sectional view of the damper and adjusting device shown in Figure 1;

Figure 4 is an enlarged fragmentary sectional view taken on the line 4—4 of Figure 1;

Figure 5 is a plan view, partly in section, showing the damper in applied position within a flue opening in a firebox.

Similar reference characters refer to similar parts in each of the views.

The damper in its present embodiment comprises a pair of plates 15 and 16 provided, respectively, with pintles 18 and 19, by which the plates are supported for pivotal movement about their longitudinal axes to permit them to move to an open position, as shown in Figure 3, or to a closed position, as shown in Figure 1. The plates are operatively connected to each other through the medium of an ear 20 on the plate 15, to which is pivotally connected a link 21 carrying a bolt 22 which extends through the slot of a second link 23. A nut 24 secures the bolt in the slot, and the slot permits of an adjustment of the link 23 lengthwise with respect to the link 21. The link 23, in turn, is connected to an ear 25 of a slotted link 26, and an arm 27 is provided with a head 28 which extends through and is secured in the plate 16. The arm 27 carries a bolt 29 and a nut 30 which co-act with the slot of the link 26 to provide an adjustable connection between the arm and the link.

From the foregoing construction of the connection between the plates 15 and 16, it will be apparent that the connection is capable of a folding movement to allow the plates to asume closed position, and, further, the connection is capable of longitudinal adjustment to compensate for any variations in the adjustment of the pintles 18 and 19, yet insuring the plates simultaneously occupying closed or open position.

As previously mentioned, my invention is applicable to vertical flues and flues of various inclinations, and to achieve this advantage, the pintles 18 and 19 are adjustable on the plates 15 and 16, respectively, in order that the pivot points of the plates can be varied to insure the gravitation of the plates to closed position.

As clearly illustrated in Figures 1 and 4, the pintles are slotted at one of their ends to receive the marginal edges of the plates and to have locking engagement with notches 31 formed in the edges of the plates. Screw bolts 32 extend through the slotted ends of the pintles and through the marginal edges of the plates to secure the pintles within the notches whereby adjustment of the pintles is maintained. By this construction the pintles can be shifted from notch to notch and transversely of the ends of the plates to occupy any position desired, it being understood that the two pintles of either plate are subject to the same adjustment.

In applying the damper to a flue of a certain inclination, it is necesary that an adjustment of the pintles be effected prior to the application of the damper to the flue in order that when the damper is once applied the plates thereof will automatically gravitate to closed position. In order to effect the desired adjustment of the pintles, I provide an adjusting device which is capable of being adjusted to assume the same inclination as the flue to which the damper is to be subsequently applied. This device, in the present instance, comprises a frame 33 of rectangular outline provided at its ends with pairs of screws 34 which are adapted to be received in any one of a plurality of openings 35 in legs or uprights, 36 positioned at the outer sides of the end portions of the frame, and wing nuts 37 on the screws by which the screws can be secured against removal from the openings. As the openings 35 are arranged one above the other on the legs 36, it will be clear that the screws 34 are capable of vertical adjustment on the legs, and with the legs resting on a suitable support such as for instance a table or bench the frame 33 can be supported at any desired inclination on the legs 36. With the frame adjusted to the same inclination as the flue to which the damper is adapted to be applied, the plates 15 and 16 are positioned within the frame 33 in the manner shown in Figure 1, and the pintles 18 and 19 are extended into openings 38 of the frame 33. By adjusting the pintles along the ends of the plates, the pivots of the plates can be adjusted until the plates normally gravitate to closed position. Thus, when the damper is applied to the flue, its pintles will be positioned so that the plates will normally gravitate to closed position.

The plates of the damper are adapted to be moved to open position through the medium of a chain 39, which is connected to an ear 40 of the plate 16 and is extended beneath the plate 15 and through a suitable sleeve 41 formed in the front wall 42 of the fireplace or other heating apparatus containing a firebox F including an upstanding collar 43, surrounding the throat opening 43ª of the firebox. The collar 43 is inclined, and its end edges may be notched to receive the pintles 18 and 19. The outer end of the chain 39 is provided with a head 44 which limits the inward movement of the chain and permits it to be manually grasped in pulling it outwardly to move the plates of the damper to open position. As the chain is pulled outwardly the link connection between the plates will cause the movement of the plate 16 to be transmitted to the plate 15, the plate 16 swinging downwardly and the plate 15 swinging upwardly. That portion of the chain extending from the sleeve is now swung so as to hang downwardly from the sleeve, in which position the uppermost link of the hanging portion of the chain will rest against the forward end of the sleeve to prevent inward movement of the chain and thereby latch the damper in any adjusted position. As soon as the extended portion of the chain is brought to horizontal position or in alinement with the remainder of the chain, the plates 15 and 16 because of their mountings will automatically gravitate to closed position. As this arrangement of chain and sleeve forms no part of my present invention and any suitable latching means can be employed, it is believed that the foregoing description will suffice.

Although I have herein shown and described only one form of damper and one form of adjusting device embodying my invention, it is to be understood that various changes and modifications may be made therein without departing from the spirit of the invention and the spirit and scope of the appended claims.

I claim as my invention:

1. A device for dampers of the character described comprising a frame having a plurality of openings therein, a plurality of legs, and an adjustable connection between the legs and the frame by which the frame can be supported in various inclined positions.

2. An adjusting device for dampers having plates and pintles adjustable on the plates to vary the pivotal points of the plates, comprising a mounting for the plates, and means by which the mounting can be adjusted to occupy horizontal and inclined positions, said mounting having means constituting a plurality of pivotal points in which the pintles of the damper are adapted to be adjusted with respect to the mounting to insure gravitation of the plates to closed position irrespective of the position occupied by the mounting.

3. An adjusting device for dampers having plates and pintles adjustable on the plates to vary the pivotal points of the plates, comprising a frame, means for adjustably supporting the frame to occupy a horizontal position or any one of a plurality of inclined positions, said frame having a plurality of openings into which the pintles of the plates are adapted to be inserted to occupy different positions with respect to the frame for the purpose described.

4. An adjusting device as embodied in claim 3 wherein said means comprises a plurality of legs for supporting the frame in elevated position, and adjustable connections between the legs and frame for permitting adjustment of the frame on the legs to occupy the positions specified.

5. An adjusting device for dampers having plates and pintles adjustable on the plates to vary the pivotal points of the plates, comprising a substantially rectangular frame including side members, the end members having a plurality of openings at intervals along their lengths into which the pintles of the damper plates are adapted to be inserted, a plurality of legs for supporting the frame in elevated position, said legs having a plurality of openings at intervals along their lengths, and fastening members extendible through the frame and through any one of the openings in the legs for securing the frame to the legs.

WILLIAM HALLBERG.